US009575195B2

(12) United States Patent
Lewis et al.

(10) Patent No.: US 9,575,195 B2
(45) Date of Patent: Feb. 21, 2017

(54) DETECTING AND QUANTIFYING HYDROCARBON VOLUMES IN SUB-SEISMIC SANDS IN THE PRESENCE OF ANISOTROPY

(71) Applicant: Schlumberger Technology Corporation, Houston, TX (US)

(72) Inventors: Richard Lewis, Heber, UT (US); Chi Duru, Lagos (NG); Rita Okoroafor, Lagos (NG)

(73) Assignee: Schlumberger Technology Corporation, Sugar Land, TX (US)

( * ) Notice: Subject to any disclaimer, the term of this patent is extended or adjusted under 35 U.S.C. 154(b) by 852 days.

(21) Appl. No.: 13/959,536

(22) Filed: Aug. 5, 2013

(65) Prior Publication Data

US 2014/0036621 A1 Feb. 6, 2014

Related U.S. Application Data

(60) Provisional application No. 61/679,458, filed on Aug. 3, 2012.

(51) Int. Cl.
*G01V 1/30* (2006.01)
*G01V 11/00* (2006.01)

(52) U.S. Cl.
CPC ........ *G01V 1/30* (2013.01); *G01V 11/00* (2013.01)

(58) Field of Classification Search
CPC .............. G01V 1/50; G01V 3/28; G01V 3/30; G01V 11/00; G01V 2210/6163
See application file for complete search history.

(56) References Cited

U.S. PATENT DOCUMENTS

| 2,749,748 A | 6/1956 | Slobod et al. |
| 4,765,182 A | 8/1988 | Boone |
| 7,471,088 B2 | 12/2008 | Yu et al. |
| 7,520,166 B2 | 4/2009 | Frechin et al. |

(Continued)

OTHER PUBLICATIONS

S.E. Johansen et al "Subsurface hydrocarbons Detected by Electromagnetic Sounding". First Break vol. 23 pp. 31-36 Mar. 2005.*

*Primary Examiner* — Luke Ratcliffe
(74) *Attorney, Agent, or Firm* — Rodney Warfford; Robert Lord (57) ABSTRACT

A method to detect presence of hydrocarbons in a subterranean formation. The method includes identifying a geological interval in the subterranean formation, analyzing a measurement of a rock sample obtained from the geological interval to generate a rock sample analysis result, wherein the rock sample analysis result indicates the presence of hydrocarbons in the geologic interval, analyzing, in response to the rock sample analysis result indicating the presence of hydrocarbons, a supplemental measurement different than the measurement of the rock sample to generate a supplemental analysis result, wherein the supplemental analysis result further indicates the presence of hydrocarbons in the geologic interval, performing, in response to the supplemental analysis result further indicating the presence of hydrocarbons, a logging operation to obtain azimuthal resistivity data of the geological interval, and presenting the rock sample analysis result, the supplemental analysis result, and the azimuthal resistivity data to a user.

20 Claims, 7 Drawing Sheets

(56) References Cited

U.S. PATENT DOCUMENTS

2004/0114464 A1\* 6/2004 Cook ..................... G01V 1/28
　　　　　　　　　　　　　　　　　　　　367/25
2007/0127314 A1\* 6/2007 Wang ..................... G01V 1/50
　　　　　　　　　　　　　　　　　　　　367/41

\* cited by examiner

DETECTING AND QUANTIFYING HYDROCARBON VOLUMES IN SUB-SEISMIC SANDS IN THE PRESENCE OF ANISOTROPY

CROSS REFERENCE TO RELATED APPLICATIONS

This application claims priority under 35 U.S.C. §119 (e) to U.S. Provisional Patent Application No. 61/679,458, filed on Aug. 3, 2012, and entitled "DETECTING AND QUANTIFYING HYDROCARBON VOLUMES IN SUB-SEISMIC SANDS IN THE PRESENCE OF ANISOTROPY" which is hereby incorporated by reference.

BACKGROUND

Operations, such as geophysical surveying, drilling, logging, well completion, and production, are typically performed to locate and gather valuable downhole fluids. Surveys are often performed using acquisition methodologies, such as seismic mapping, resistivity mapping, etc. to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any type of valuable fluids or minerals can be found and the activities required to extract them. The terms may also refer to sites where substances are deposited or stored by injecting the substances into the surface using boreholes and the operations associated with this process. Further, the term "field operation" refers to a field operation associated with a field, including activities related to field planning, wellbore drilling, wellbore completion, and/or production using the wellbore.

Multiple survey apparatuses that are not interrelated often produce conflicting measurements due to the vagaries of sub-seismic sands and the effects of anisotropy. As a result, hydrocarbon baring sands are often wrongly interpreted as wet (i.e., containing mostly water).

SUMMARY

In general, in one aspect, the invention relates to a method to detect presence of hydrocarbons in a subterranean formation. The method includes identifying a geological interval in the subterranean formation, analyzing, by a computer processor, a measurement of a rock sample obtained from the geological interval to generate a rock sample analysis result, wherein the rock sample analysis result indicates the presence of hydrocarbons in the geologic interval, analyzing, by the computer processor and in response to the rock sample analysis result indicating the presence of hydrocarbons, a supplemental measurement different than the measurement of the rock sample to generate a supplemental analysis result, wherein the supplemental analysis result further indicates the presence of hydrocarbons in the geologic interval, performing, in response to the supplemental analysis result further indicating the presence of hydrocarbons, a logging operation to obtain azimuthal resistivity data of the geological interval, and presenting the rock sample analysis result, the supplemental analysis result, and the azimuthal resistivity data to a user.

Other aspects of detecting and quantifying hydrocarbon volumes in sub-seismic sands in the presence of anisotropy will be apparent from the following description and the appended claims.

BRIEF DESCRIPTION OF DRAWINGS

The appended drawings illustrate several embodiments of detecting and quantifying hydrocarbon volumes in sub-seismic sands in the presence of anisotropy and are not to be considered limiting of its scope, for detecting and quantifying hydrocarbon volumes in sub-seismic sands in the presence of anisotropy may admit to other equally effective embodiments.

FIG. 1.1 is a schematic view, partially in cross-section, of a field in which one or more embodiments of detecting and quantifying hydrocarbon volumes in sub-seismic sands in the presence of anisotropy may be implemented.

FIG. 1.2 shows a hydrocarbon volume analysis computer system in accordance with one or more embodiments.

FIGS. 3.1-3.2 depict an example for detecting and quantifying hydrocarbon volumes in sub-seismic sands in the presence of anisotropy in accordance with one or more embodiments.

DETAILED DESCRIPTION

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Aspects of the present disclosure include a method, system, and computer readable medium for detecting hydrocarbons in reservoirs or mines where a layer (e.g., a geological interval, a bed, or a vein) is of sub-seismic scale, where there is formation contrast at bed boundaries, where apparent dips are present, or where horizontal and vertical stresses vary and other anisotropic features are present. Accordingly, hydrocarbon reserves are estimated more accurately without being underestimated due to the presence of thin layers and anisotropy. Upward adjustment of hydrocarbon reserves estimate based on the present disclosure provides a compelling justification to change the original development/production plan where the reservoir/mine layer thickness is below the seismic resolution and has not been considered in the original plan. Further, such improved accuracy in hydrocarbon reserves estimate based on the present disclosure may be used to resolve common conflicting indications between mud logging and logging while drilling (LWD). In particular, while mud logging may indicate hydrocarbon in a thin geologic layer, the LWD measurements may indicate that the geologic layer is water bearing because it is unable to detect the hydrocarbon due to anisotropy. In another example, deployment decision of the azimuthal resistivity tool may be based on such improved accuracy in hydrocarbon reserves estimate. Those fields that pre-date the azimuthal resistivity technology where LWD or wireline measurement was used as the primary reservoir evaluation, most of the LWD or wireline sensors were unable to detect or accurately measure these pay sands. Hydrocarbon reserves estimate based on the present disclosure may be applied to re-evaluate oil and gas fields already in development where a reservoir/mine of sub-seismic scale and anisotropic features are present.

Figure 11:
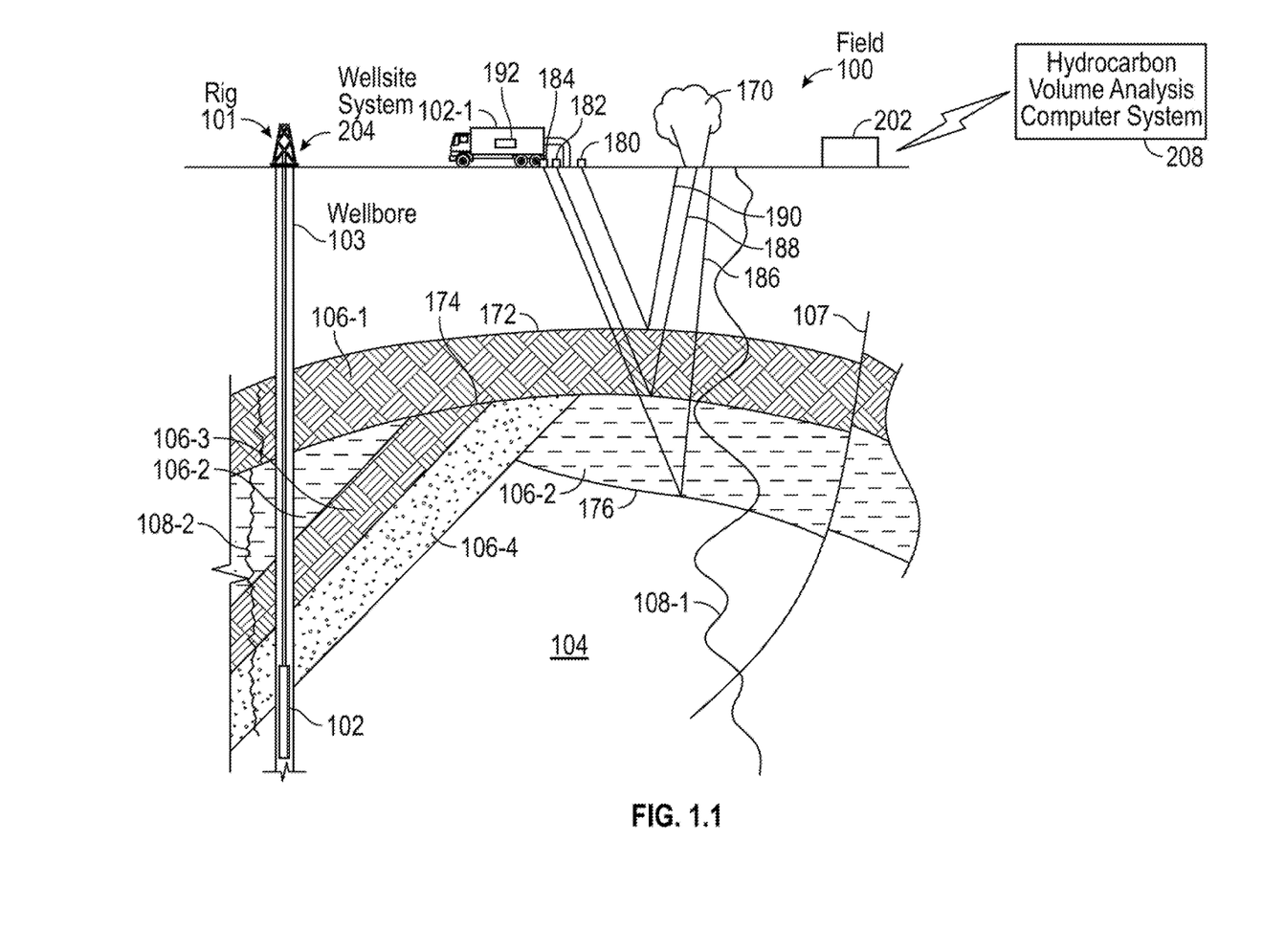

FIG. 1.1 depicts a schematic view, partially in cross section, of a field (100) in which one or more embodiments of detecting and quantifying hydrocarbon volumes in sub-seismic sands in the presence of anisotropy may be implemented. In one or more embodiments, one or more of the modules and elements shown in FIG. 1.1 may be omitted, repeated, and/or substituted. The field configuration of FIG. 1.1 is not intended to limit the scope of detecting and quantifying hydrocarbon volumes in sub-seismic sands in the presence of anisotropy. Part or all of the field (100) may be on land and/or sea (i.e. in an offshore environment). Also, while a single field with a single wellsite is depicted, any combination of one or more fields and one or more wellsites may be present. Accordingly, embodiments of detecting and quantifying hydrocarbon volumes in sub-seismic sands in the presence of anisotropy should not be considered limited to the specific arrangements of modules shown in FIG. 1.1.

As shown in FIG. 1.1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, various survey tools and/or data acquisition tools are adapted to measure the formation and detect the characteristics of the geological structures of the formation. As noted above, the outputs of these various survey tools and/or data acquisition tools, as well as data derived from analyzing the outputs, are considered as part of the historic information.

As shown in FIG. 1.1, seismic truck (102-1) represents a survey tool that is adapted to measure properties of the subterranean formation in a seismic survey operation based on sound vibrations. One such sound vibration (e.g., 186, 188, 190) generated by a source (170) reflects off a plurality of horizons (e.g., 172, 174, 176) in the subterranean formation (104). Each of the sound vibrations (e.g., 186, 188, 190) are received by one or more sensors (e.g., 180, 182, 184), such as geophone-receivers, situated on the earth's surface. The geophones produce electrical output signals, which may be transmitted, for example, as input data to a computer (192) on the seismic truck (102-1). Responsive to the input data, the computer (192) may generate a seismic data output, which may be logged and provided to a surface unit (202) by the computer (192) for further analysis. The computer (192) may be the computer system shown and described in relation to FIG. 4. Although the geophones are shown in FIG. 1.1 to be located at the earth surface, other seismic sensors may be located within a borehole, such as the wellbore (103). Further, although the seismic truck (102-1) is used as the seismic source as shown in FIG. 1.1, other seismic source such as an offshore vessel may also be used over water.

Further as shown in FIG. 1.1, the wellsite system (204) is associated with a rig (101), a wellbore (103), and other wellsite equipment and is configured to perform wellbore operations, such as logging, drilling, fracturing, production, or other applicable operations. Generally, survey operations and wellbore operations are referred to as field operations of the field (100). These field operations are typically performed as directed by the surface unit (202).

In one or more embodiments, the surface unit (202) is operatively coupled to the computer (192) and/or a wellsite system (204). In particular, the surface unit (202) is configured to communicate with the computer (192) and/or the data acquisition tool (102) to send commands to the computer (192) and/or the data acquisition tools (102) and to receive data therefrom. For example, the data acquisition tool (102) may be adapted for measuring downhole properties using logging-while-drilling ("LWD") tools or wireline tools. In one or more embodiments, surface unit (202) may be located at the wellsite system (204) and/or remote locations. The surface unit (202) may be provided with computer facilities for receiving, storing, processing, and/or analyzing data from the computer (192), the data acquisition tool (102), or other part of the field (104). The surface unit (202) may also be provided with or functionally for actuating mechanisms at the field (100). The surface unit (202) may then send command signals to the field (100) in response to data received, for example to control and/or optimize various field operations described above.

In one or more embodiments, the data received by the surface unit (202) represents characteristics of the subterranean formation (104) and may include seismic data and/or information related to porosity, saturation, permeability, natural fractures, stress magnitude and orientations, elastic properties, etc. during a drilling, fracturing, logging, or production operation of the wellbore (103) at the wellsite system (204). For example, data plot (108-1) may be a seismic two-way response time or other types of seismic measurement data. In another example, data plot (108-2) may be a wireline log or a LWD log, which is a measurement of a formation property as a function of depth taken by an electrically powered instrument to infer properties and make decisions about drilling and production operations. The record of the measurements, e.g., on a long strip of paper, may also be referred to as a log. Measurements obtained by a wireline log may include resistivity measurements obtained by a resistivity measuring tool. In yet another example, the data plot (108-2) may be a plot of a dynamic property, such as the fluid flow rate over time during production operations. Those skilled in the art will appreciate that other data may also be collected, such as, but not limited to, historical data, user inputs, economic information, other measurement data, and other parameters of interest.

In one or more embodiments, the surface unit (202) is communicatively coupled to a hydrocarbon volume analysis computer system (208). In one or more embodiments, the data received by the surface unit (202) may be sent to the hydrocarbon volume analysis computer system (208) for further analysis. Generally, the hydrocarbon volume analysis computer system (208) is configured to analyze, model, control, optimize, or perform other management tasks of the aforementioned field operations based on the data provided from the surface unit (202). In one or more embodiments, the hydrocarbon volume analysis computer system (208) is provided with functionality for manipulating and analyzing the data, such as performing seismic interpretation or borehole resistivity image log interpretation, to identify geological surfaces in the subterranean formation (104) or performing simulation, planning, and optimization of production operations of the wellsite system (204). In one or more embodiments, the result generated by the hydrocarbon volume analysis computer system (208) may be displayed for user viewing using a 2 dimensional (2D) display, 3 dimensional (3D) display, or other suitable displays. Although the surface unit (202) is shown as separate from the hydrocarbon volume analysis computer system (208) in FIG. 1.1, in other examples, the surface unit (202) and the hydrocarbon volume analysis computer system (208) may also be combined.

Figure 12:
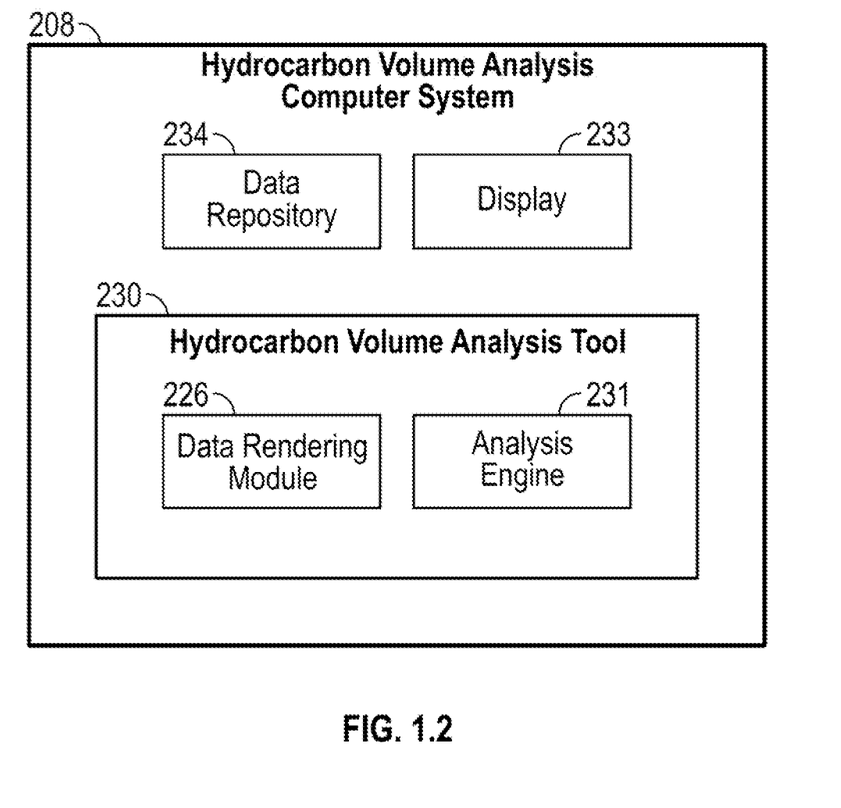

FIG. 1.2 shows more details of the hydrocarbon volume analysis computer system (208) in which one or more embodiments of detecting and quantifying hydrocarbon volumes in sub-seismic sands in the presence of anisotropy may be implemented. In one or more embodiments, one or more of the modules and elements shown in FIG. 1.2 may be omitted, repeated, and/or substituted. Accordingly, embodiments of detecting and quantifying hydrocarbon volumes in sub-seismic sands in the presence of anisotropy should not be considered limited to the specific arrangements of modules shown in FIG. 1.2.

As shown in FIG. 1.2, the hydrocarbon volume analysis computer system (208) includes hydrocarbon volume analysis tool (230) having analysis engine (231) and data rendering module (226), data repository (234), and display (233). Each of these elements is described below.

In one or more embodiments, the hydrocarbon volume analysis computer system (208) includes the hydrocarbon volume analysis tool (230) having software instructions stored in a memory and executing on a processor to communicate with the surface unit (202) for receiving data therefrom and to manage (e.g., analyze, model, control, optimize, or perform other management tasks) the aforementioned field operations based on the received data. In one or more embodiments, the received data is stored in the data repository (234) to be processed by the hydrocarbon volume analysis tool (230). One or more field operation management tasks (e.g., analysis task, modeling task, control task, optimization task, etc.) may be performed based on results of the hydrocarbon volume analysis tool (230). During the operation of the hydrocarbon volume analysis tool (230), the received data is manipulated by the analysis engine (231) to generate, continuously or intermittently, preliminary results that are rendered and displayed to the user using the data rendering module (226) and the display (233), respectively. In one or more embodiments, the display (233) may be a 2D display, a 3D display, or other suitable display device. The processor and memory of the hydrocarbon volume analysis computer system (208) are not explicitly depicted in FIG. 1.2 so as not to obscure other elements of the hydrocarbon volume analysis computer system (208). An example of such processor and memory is described in reference to FIG. 4 below.

The data repository (234) (and/or any information stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The data repository (234) may be a device internal to the hydrocarbon volume analysis computer system (208). Alternatively, the data repository (234) may be an external storage device operatively connected to the hydrocarbons volume analysis computer system (208).

In one or more embodiments, the analysis engine (231) is configured to analyze geological interval measurements for determining whether the geological interval contains primarily water or hydrocarbons. For example, the geological interval may be one of the geological structures (106-1 through 106-4) shown in FIG. 1 above. In one or more embodiments, the geological interval intercepts a reservoir or a mine. For example, part of the geological structures (106-1 through 106-4) shown in FIG. 1 above forms a hydrocarbon reservoir or a heavy oil mine. In particular, the reservoir is typically accessed via a borehole, such as the wellbore (103) penetrating the geological structures (106-1 through 106-4) shown in FIG. 1 above. Although not explicitly shown in FIG. 1.1 above, the heavy oil mine may be accessed via a mining mechanism known to those skilled in the art.

In one or more embodiments, the geological interval has a sub-seismic thickness, an apparent dip, an anisotropic feature (e.g., different horizontal and vertical stresses), or a combination thereof. For example, the geological interval having such features may be identified based on lithology or historical data of a neighboring well in proximity to the borehole in a producing field on land or in an offshore environment.

In one or more embodiments, the geological interval measurements may include one or more of rock sample measurement(s), supplemental measurement(s), and azimuthal resistivity data, which are analyzed in a pre-determined workflow sequence. The rock sample may be obtained from a reservoir accessed via a borehole as well as a heavy oil mine. For example, the rock sample may be obtained using a mud-logging tool and obtained as cuttings from drilling fluid circulating in the borehole during a wireline logging or LWD operation. In addition, the supplemental measurement(s) and azimuthal resistivity data may be wireline log data or LWD data shown as the data plot (108-2) in FIG. 1.1 above. In another example, the rock sample, the supplemental measurement(s), and the azimuthal resistivity data may be obtained from a heavy oil mine using techniques and tools known to those skilled in the art. In one or more embodiments, the supplemental measurement(s) may include multiple formation pressure measurements corresponding to varying depths. For example, a formation pressure gradient log may be generated for analysis based on the multiple formation pressure measurements.

In one or more embodiments, the rock sample analysis result, the supplemental analysis result, and the azimuthal resistivity data are presented to a user in the pre-determined workflow sequence. For example, these results and data may be presented using the data rendering module (226) described above.

Figure 31:
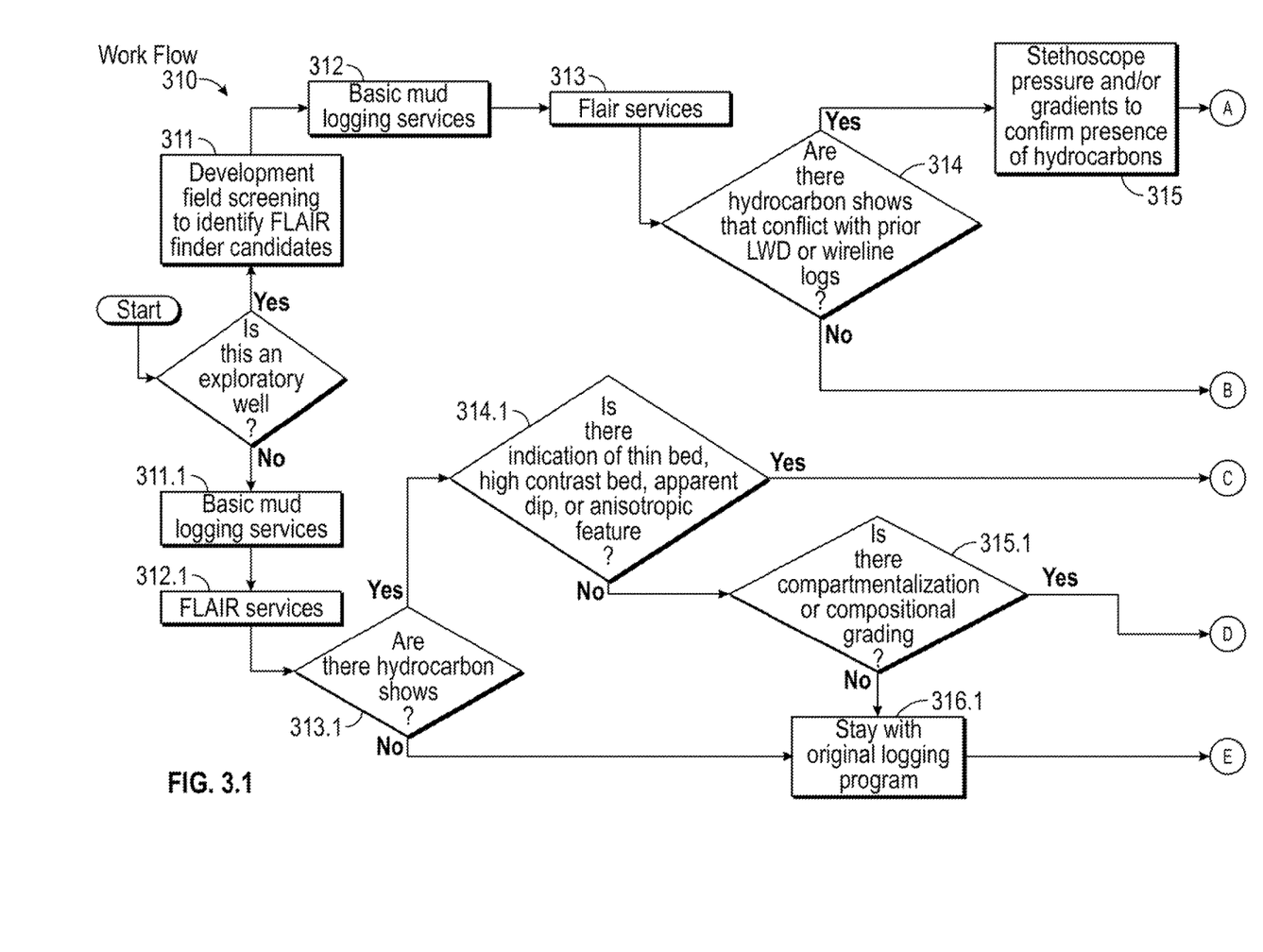

Details of the pre-determined workflow sequence are described in reference to FIGS. 2 and 3.1 below.

Figure 2:
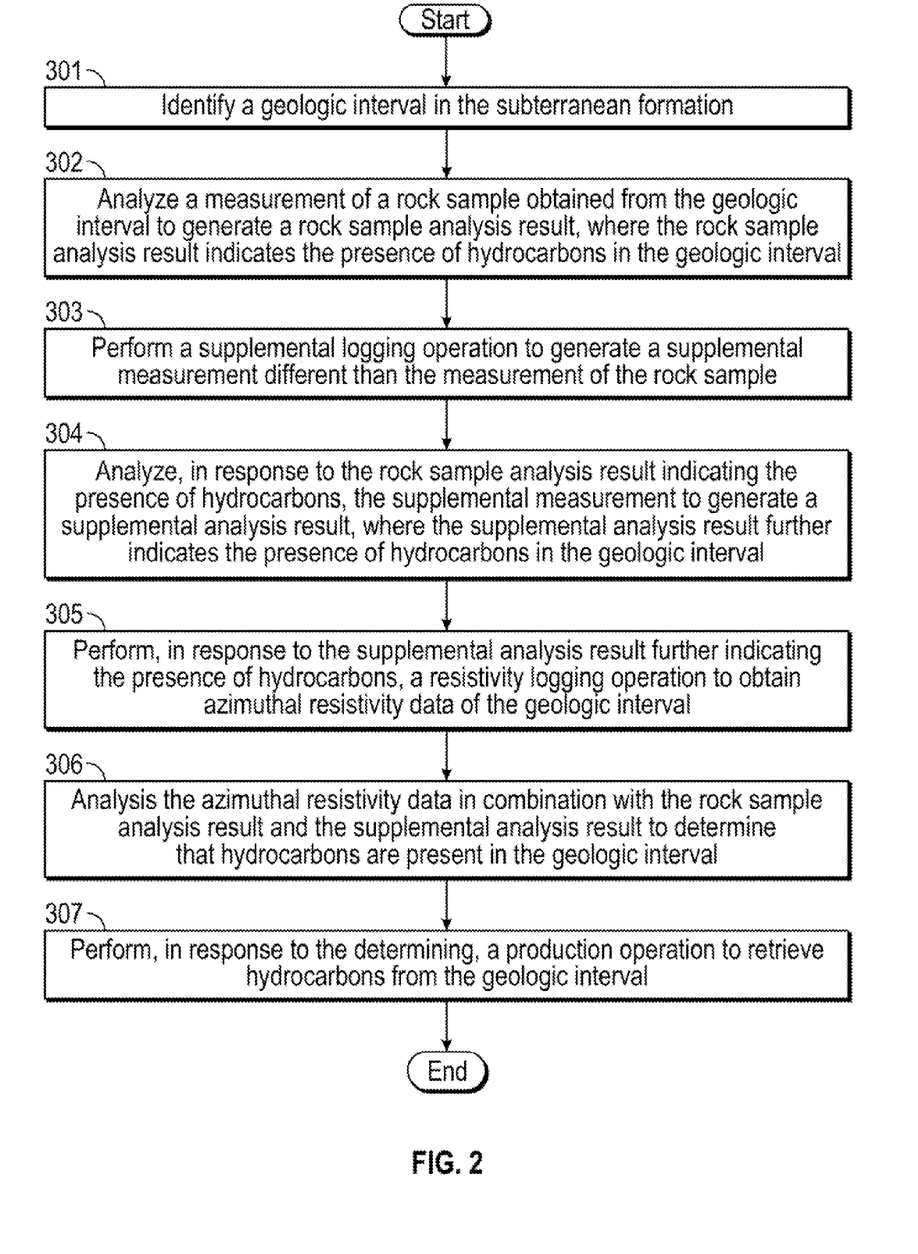
FIG. 2 shows an example method for detecting and quantifying hydrocarbon volumes in sub-seismic sands in the presence of anisotropy in accordance with one or more embodiments.

FIG. 2 depicts an example method for detecting and quantifying hydrocarbon volumes in sub-seismic sands in the presence of anisotropy in accordance with one or more embodiments. For example, the method depicted in FIG. 2 may be practiced using the hydrocarbon volume analysis computer system (208) described in reference to FIGS. 1.1 and 1.2 above. In one or more embodiments, one or more of the elements shown in FIG. 2 may be omitted, repeated, and/or performed in a different order. Accordingly, embodiments of detecting and quantifying hydrocarbon volumes in sub-seismic sands in the presence of anisotropy should not be considered limited to the specific arrangements of elements shown in FIG. 2.

Initially in Element 301, a geological interval in the subterranean formation is identified. In one or more embodiments, the geological interval has a sub-seismic thickness, an apparent dip, an anisotropic feature (e.g., different horizontal and vertical stresses), or a combination thereof. As noted above, the geological interval having such features may be identified based on lithology or historical data of a neighboring well in proximity to the borehole in a producing field.

In Element 302, a measurement of a rock sample obtained from the geological interval is analyzed to generate a rock sample analysis result. In one or more embodiments, the rock sample is obtained using a mud-logging tool and obtained as cuttings from drilling fluid circulating in the borehole during a wireline logging or LWD operation. In such embodiments, the analysis is performed using mud-logging technique known to those skilled in the art. By using the mud-logging technique, the rock sample analysis result identifies contents of true reservoir fluids from the drilling fluids (i.e., mud). In one or more embodiments, the rock sample analysis result indicates the presence of hydrocarbons in the geologic interval.

In Element 303, a supplemental measurement of the geological interval is obtained to confirm the rock sample analysis result. In particular, the supplemental measurement is different than the measurement of the rock sample. In one or more embodiments, the supplemental measurement includes multiple formation pressure measurements corresponding to varying depths within and/or surrounding the geological interval. For example, the formation pressure measurements may be obtained during a LWD operation in a borehole penetrating the geological interval. In another example, the formation pressure measurements may be obtained from a mine using techniques known to those skilled in the art.

In Element 304, in response to the rock sample analysis result indicating the presence of hydrocarbons, the supplemental measurement is analyzed to generate a supplemental analysis result. As noted above, the supplemental analysis result is for confirming the rock sample analysis result indicating the presence of hydrocarbons. In one or more embodiments, the supplemental analysis result further indicates the presence of hydrocarbons in the geologic interval. In other words, the supplemental analysis result confirms the rock sample analysis result.

In one or more embodiments, the supplemental measurement includes the aforementioned formation pressure measurements that are analyzed to generate a formation pressure gradient log. In particular, the formation pressure gradient represents a rate of change of the formation pressure over depth. Generally, different fluids in the geological interval result in different formation pressure gradients. Accordingly, the formation pressure gradient is analyzed to determine whether fluid contained in the geological interval is substantially water or hydrocarbons. For example, the formation pressure gradient may be compared to known gradient values of water or hydrocarbons containing rocks at the corresponding depth of the geological interval.

In Element 305, in response to the supplemental analysis result further indicating the presence of hydrocarbons, a logging operation is performed to obtain azimuthal resistivity data of the geological interval. For example, the logging operation to obtain the azimuthal resistivity data may be performed subsequent to the aforementioned wireline logging or LWD operation. In one or more embodiments, the azimuthal resistivity data is for further confirming the rock sample analysis result and the supplemental analysis result, both indicating the presence of hydrocarbons. While the azimuthal resistivity data is primarily used for the confirming the presence of hydrocarbons, the azimuthal resistivity data also offers a much higher resolution for determining the existence of thin layers and the ability to generate an accurate total sand thickness.

In one or more embodiments, the azimuthal resistivity data is presented to a user in combination with the rock sample analysis result and the supplemental analysis result. Accordingly, the user may make the final determination as to whether the geological interval contains primarily water or hydrocarbons. In such embodiments, the method ends at this point.

In one or more embodiments, the method continues to Element 306 where the azimuthal resistivity data is analyzed automatically in combination with the rock sample analysis result and the supplemental analysis result to generate the final determination as to whether the geological interval contains primarily water or hydrocarbons.

In Element 307, in response to the final determination, a production operation is performed to retrieve hydrocarbons from the geological interval. For example, the hydrocarbons may be extracted from a reservoir using the borehole or extracted from a heavy oil mine using a suitable mechanism.

FIGS. 3.1-3.2 depict various workflow sequence examples and data log examples that further illustrate the detecting and quantifying hydrocarbon volumes in sub-seismic sands in the presence of anisotropy in accordance with one or more embodiments. In one of more embodiments, the example depicted in FIGS. 3.1-3.2 is practiced using the hydrocarbon volume analysis computer system (208) and/or the method flow chart described in reference to FIG. 1.2 and FIG. 2 above described above. Specifically, the example depicted in FIGS. 3.1-3.2 relates to a scenario where mud logging may indicate presence of hydrocarbon but is unable to quantify composition beyond C1 and C2. In such scenario if the "show from mud logging" cannot be confirmed by other measurements from LWD or wireline logging, it is often ignored based on conventional practice. Generally, the pre-planning for the zones of interest are taken from seismic resolution, therefore thin sands (e.g., thinner than 60′, such as 10′, 20′, and 30′) are often not considered in the planning based on conventional practice. Such deficiency based on conventional practice is addressed in the example shown in FIGS. 3.1-3.2.

FIG. 3.1 shows a workflow (310) that splits into a choice of either an exploration category (labeled as 311.1 through 320.1 and shown in the bottom portion of FIG. 3.1) or development category (labeled as 311 through 320 and shown in the top portion of FIG. 3.1). In the exploration embodiment, it is assumed wireline logs will be run. In the development embodiment, it is assumed that the primary reservoir evaluation method is using LWD and not wireline. However, other embodiments can also be considered.

The workflow (310) is performed using wellsite apparatus such as:
(i) Mud logging apparatus with the Geoservice Flair (a commercial tool from Schlumberger Technology Corporation, Houston, Tex.) capabilities.
(ii) LWD or wireline apparatus including downhole pressure testing and surface read out capabilities.
(iii) Communication apparatus to transmit data to an interpretation expert.
(iv) Suitable computing capabilities.
(v) Modeling software tools for the depth corrections to correct the detected hydrocarbon to downhole depth.
(vi) Interpretation tools and software to plot gradients of the downhole pressures taken and calculate the accurate water and hydrocarbon saturations from the azimuthal resistivity measurements.

The workflow serves both exploration and development wells. The bottom portion (labeled as elements 311.1 through 320.1) of the workflow (310) applies to exploration fields. On an unplanned detection of hydrocarbon by the mud logging Flair apparatus, the measurements from the wellsite sensors are interpreted and placed back downhole on geologic depth at the reservoir. A sequence of options are chosen that can include, but are not limited to, taking multiple formation pressure measurements and plotting them on a gradient to confirm the fluid in the reservoir as either water or not. At any decision point, if second measurement(s) fail the criteria to confirm the presence of hydrocarbons, the workflow returns to the original drilling and evaluation plan. If hydrocarbons are detected and then re-confirmed with a different measurement, a decision to add an azimuthal resistivity tool to the logging program is taken, as one option. This decision may also be deferred to the next borehole based on the drilling rig schedule. The time to run through one decision cycle is typically several hours.

The top portion (labeled as elements 311 through 320) of the workflow (310) applies to producing fields. For example, in producing fields discovered prior to early 2000's, a thin sand would have been determined as wet. In applying the workflow (310), these fields are assumed to be drilled and logged with basic LWD tools only, bypassing volumes of hydrocarbons. The use of this branch of the workflow (310) allows proper detection and quantification that can lead to extracting more oil or gas than previously expected.

The workflow (310), in particular elements (320), (319.1), and (320.1) as shown in FIG. 3.1, may be practiced to insure all reservoir layers with hydrocarbon volumes determined to be commercial are planned for further testing and or completion. For example, a pre-determined criterion determined by one skilled in the art may be used to designate identified hydrocarbons presence as being commercial.

Figure 32:
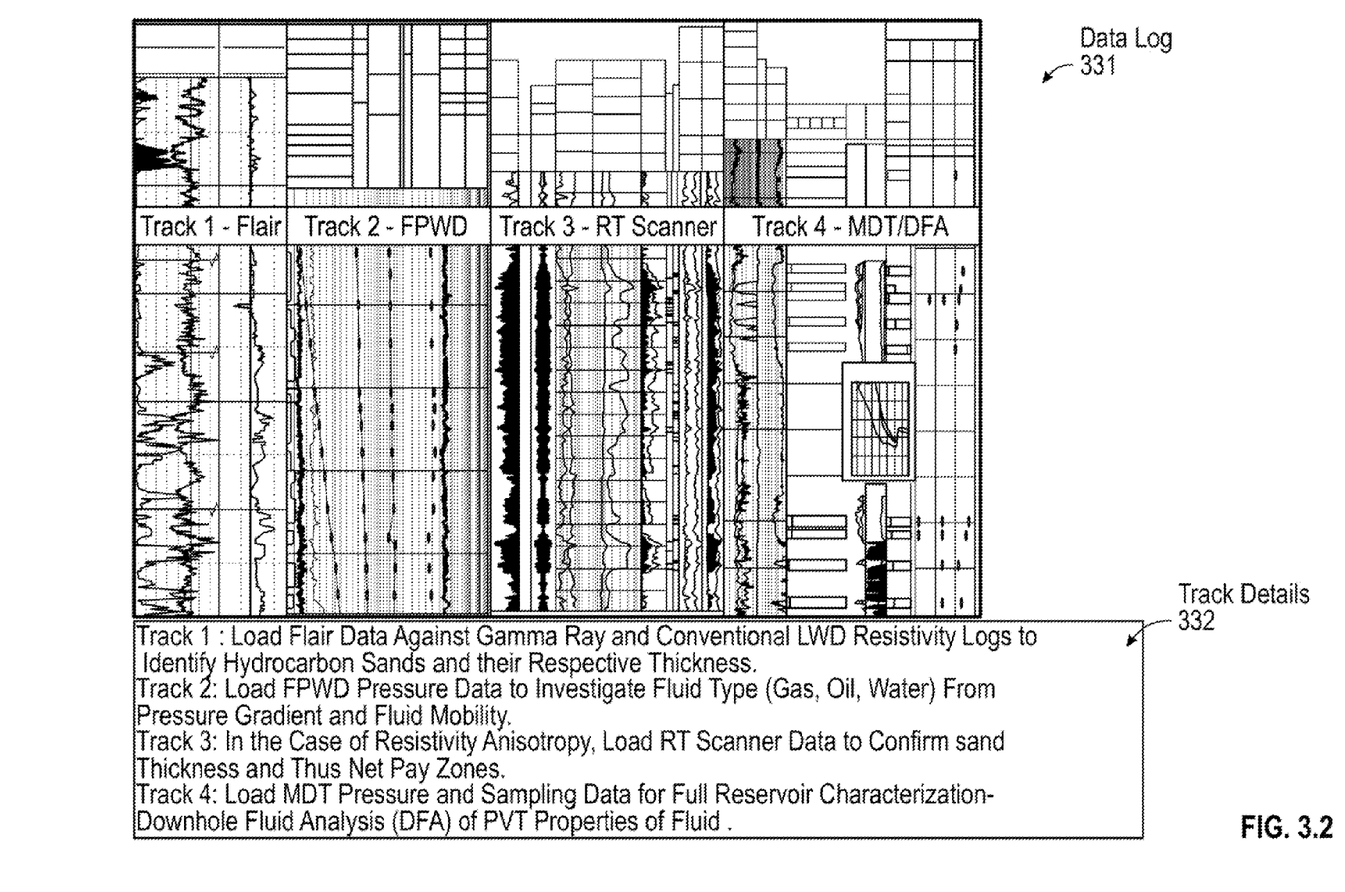

FIG. 3.2 depicts an example data log (331) having four tracks, in which each of the four tracks are described by the specific track details (332). In particular, the track 1 represents an example of rock sample measurements such as mud-logging data, the track 2 represents an example of formation pressure measurements such as stethoscope data, the track 3 represents an example of azimuthal resistivity data, and the track 4 represents an example of downhole fluid analysis data. For example, these four tracks relate to elements 312, 313, 315, 318, 312.1, 317.1, and 318.1 shown in FIG. 3.1 above.

Figure 4:
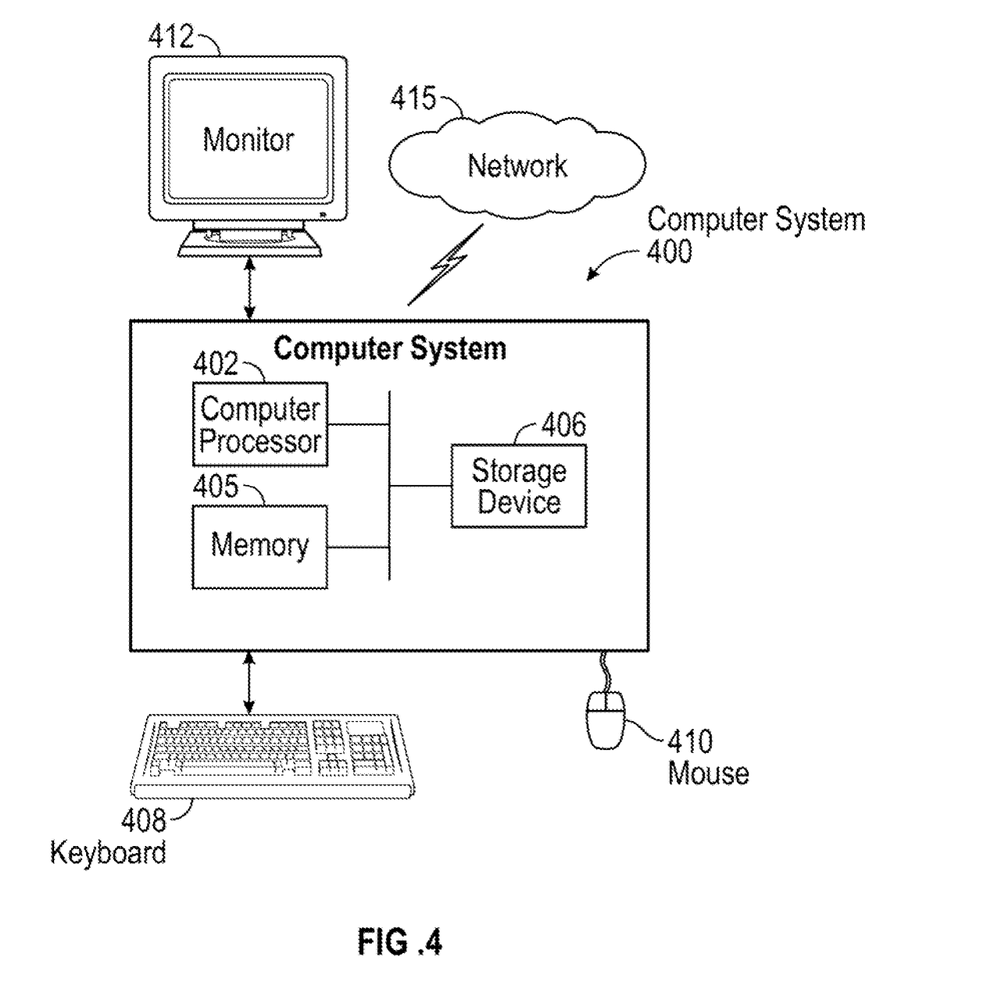
FIG. 4 depicts a computer system that may be used to implement one or more embodiments of detecting and quantifying hydrocarbon volumes in sub-seismic sands in the presence of anisotropy.

Embodiments of detecting and quantifying hydrocarbons volumes in sub-seismic sands in the presence of anisotropy may be implemented on virtually any type of computer regardless of the platform being used. For instance, as shown in FIG. 4, a computer system (400) includes one or more computer processor(s) (402) such as a central processing unit (CPU), integrated circuit, or other hardware processor, associated memory (405) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display LCD, a plasma display, or cathode ray tube (CRT) monitor). The computer system (400) may be connected to a network (415) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input, and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While detecting and quantifying hydrocarbons volumes in sub-seismic sands in the presence of anisotropy has been described with respect to a limited number of embodiments, those skilled in the art, having benefit of this disclosure, will appreciate that other embodiments may be devised which do not depart from the scope of detecting and quantifying hydrocarbons volumes in sub-seismic sands in the presence of anisotropy as disclosed herein. Accordingly, the scope of detecting and quantifying hydrocarbons volumes in sub-seismic sands in the presence of anisotropy should be limited only by the attached claims.

What is claimed is:

1. A method to detect presence of hydrocarbons in a subterranean formation, comprising:

identifying a geological interval in the subterranean formation;

analyzing, by a computer processor, a measurement of a rock sample obtained from the geological interval to generate a rock sample analysis result, wherein the rock sample analysis result indicates the presence of hydrocarbons in the geologic interval;

analyzing, by the computer processor and in response to the rock sample analysis result indicating the presence of hydrocarbons, a supplemental measurement different than the measurement of the rock sample to generate a supplemental analysis result, wherein the supplemental analysis result further indicates the presence of hydrocarbons in the geologic interval;

generating, in response to the supplemental analysis result further indicating the presence of hydrocarbons, a command signal to control a logging tool to perform a logging operation;

obtaining, from the logging operation, azimuthal resistivity data of the geological interval; and presenting the rock sample analysis result, the supplemental analysis result, and the azimuthal resistivity data to a user.

2. The method of claim 1, further comprising:
analyzing the azimuthal resistivity data in combination with the rock sample analysis result and the supplemental analysis result to determine that hydrocarbons are present in the geological interval; and
performing, in response to the determining, a production operation to retrieve hydrocarbons from the geological interval.

3. The method of claim 1,
wherein the supplemental measurement comprises multiple formation pressure measurements, and
wherein analyzing the supplemental measurement comprises:
generating a formation pressure gradient log based on the multiple formation pressure measurements; and
analyzing the formation pressure gradient to determine whether fluid contained in the geological interval is substantially water or hydrocarbons.

4. The method of claim 3, further comprising:
performing, in a borehole penetrating the geological interval, a logging-while-drilling (LWD) operation to generate the supplemental measurement,
wherein the rock sample comprises cuttings from drilling fluid circulating in the borehole during the LWD operation, and
wherein the logging operation to obtain the azimuthal resistivity data is performed subsequent to the LWD operation.

5. The method of claim 1,
wherein the geological interval comprises a sub-seismic thickness that is identified based on lithology of the borehole.

6. The method of claim 1,
wherein the geological interval comprises a sub-seismic thickness that is identified based on historical data of a neighboring well in proximity to the borehole in a producing field.

7. The method of claim 1,
wherein the rock sample is obtained from a mine intercepting the geological interval, and
wherein the hydrocarbons comprises heavy oil contained in the mine.

8. A system to detect presence of hydrocarbons in a subterranean formation, comprising:
a rock sample retrieving apparatus configured to obtain a rock sample from a geological interval in the subterranean formation;
a supplemental measurement apparatus configured to obtain a supplemental measurement; and
a surface unit comprising a computer processor that is configured to:
identify the geological interval in the subterranean formation;
analyze a measurement of the rock sample to generate a rock sample analysis result, wherein the rock sample analysis result indicates the presence of hydrocarbons in the geological interval;
analyze, in response to the rock sample analysis result indicating the presence of hydrocarbons, the supplemental measurement that is different than the measurement of the rock sample to generate a supplemental analysis result, wherein the supplemental analysis result further indicates the presence of hydrocarbons in the geological interval;
perform, in response to the supplemental analysis result further indicating the presence of hydrocarbons, a logging operation to obtain azimuthal resistivity data of the geological interval; and
present the rock sample analysis result, the supplemental analysis result, and the azimuthal resistivity data to a user.

9. The system of claim 8, wherein the computer processor is further configured to:
analyze the azimuthal resistivity data in combination with the rock sample analysis result and the supplemental analysis result to determine that hydrocarbons are present in the geological interval; and
perform, in response to the determining, a production operation to retrieve hydrocarbons from the geological interval.

10. The system of claim 8,
wherein the supplemental measurement comprises multiple formation pressure measurements, and
wherein analyzing the supplemental measurement comprises:
generating a formation pressure gradient log based on the multiple formation pressure measurements; and
analyzing the formation pressure gradient to determine whether fluid contained in the geological interval is substantially water or hydrocarbons.

11. The system of claim 10, wherein the computer processor is further configured to:
perform, in a borehole penetrating the geological interval, a logging-while-drilling (LWD) operation to generate the supplemental measurement,
wherein the rock sample comprises cuttings from drilling fluid circulating in the borehole during the LWD operation,
wherein the logging operation to obtain the azimuthal resistivity data is performed subsequent to the LWD operation,
wherein the supplemental measurement apparatus comprises a LWD tool, and
wherein the rock sample retrieving apparatus comprises a mud-logging tool.

12. The system of claim 8,
wherein the geological interval comprises a sub-seismic thickness that is identified based on lithology of the borehole.

13. The system of claim 8,
wherein the geological interval comprises a sub-seismic thickness that is identified based on historical data of a neighboring well in proximity to the borehole in a producing field.

14. The system of claim 8,
wherein the rock sample is obtained from a mine intercepting the geological interval, and
wherein the hydrocarbons comprises heavy oil contained in the mine.

15. A non-transitory computer readable medium storing instructions for detecting presence of hydrocarbons in a subterranean formation, the instructions when executed causing a processor to:
identify a geological interval in the subterranean formation;
analyze a measurement of a rock sample obtained from the geological interval to generate a rock sample analysis result, wherein the rock sample analysis result indicates the presence of hydrocarbons in the geologic interval;
analyze, in response to the rock sample analysis result indicating the presence of hydrocarbons, a supplemental measurement different than the measurement of the rock sample to generate a supplemental analysis result, wherein the supplemental analysis result further indicates the presence of hydrocarbons in the geologic interval;

generate, in response to the supplemental analysis result further indicating the presence of hydrocarbons, a command signal to control a logging tool to perform a logging operation;

obtain, from the logging operation, azimuthal resistivity data of the geological interval; and present the rock sample analysis result, the supplemental analysis result, and the azimuthal resistivity data to a user.

16. The non-transitory computer readable medium of claim 15, the instructions when executed further causing the processor to:

analyze the azimuthal resistivity data in combination with the rock sample analysis result and the supplemental analysis result to determine that hydrocarbons are present in the geological interval; and perform, in response to the determining, a production operation to retrieve hydrocarbons from the geological interval.

17. The non-transitory computer readable medium of claim 15, wherein the supplemental measurement comprises multiple formation pressure measurements, and wherein analyzing the supplemental measurement comprises:

generating a formation pressure gradient log based on the multiple formation pressure measurements; and analyzing the formation pressure gradient to determine whether fluid contained in the geological interval is substantially water or hydrocarbons.

18. The non-transitory computer readable medium of claim 17, the instructions when executed causing a processor to:

perform, in a borehole penetrating the geological interval, a logging-while-drilling (LWD) operation to generate the supplemental measurement, wherein the rock sample comprises cuttings from drilling fluid circulating in the borehole during the LWD operation, and wherein the logging operation to obtain the azimuthal resistivity data is performed subsequent to the LWD operation.

19. The non-transitory computer readable medium of claim 15, wherein the geological interval comprises a sub-seismic thickness that is identified based on lithology of the borehole.

20. The non-transitory computer readable medium of claim 15, wherein the geological interval comprises a sub-seismic thickness that is identified based on historical data of a neighboring well in proximity to the borehole in a producing field.

* * * * *